US012124908B2

(12) United States Patent
Lu et al.

(10) Patent No.: US 12,124,908 B2
(45) Date of Patent: Oct. 22, 2024

(54) AUTOMATIC CARD CONNECTION METHOD, ELECTRONIC DEVICE, AND COMPUTER READABLE STORAGE MEDIUM

(71) Applicant: FEITIAN TECHNOLOGIES CO., LTD., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 273 days.

(21) Appl. No.: 17/774,123

(22) PCT Filed: Jan. 1, 2021

(86) PCT No.: PCT/CN2021/070052
§ 371 (c)(1),
(2) Date: May 3, 2022

(87) PCT Pub. No.: WO2021/136543
PCT Pub. Date: Jul. 8, 2021

(65) Prior Publication Data
US 2022/0391605 A1    Dec. 8, 2022

(30) Foreign Application Priority Data

Jan. 3, 2020 (CN) .......................... 202010003756.7

(51) Int. Cl.
G06K 7/00 (2006.01)
G06K 7/10 (2006.01)
H04W 4/80 (2018.01)

(52) U.S. Cl.
CPC ....... *G06K 7/0095* (2013.01); *G06K 7/10297* (2013.01); *H04W 4/80* (2018.02)

(58) Field of Classification Search
CPC .... G06K 7/0095; G06K 7/10297; H04W 4/80
See application file for complete search history.

(56) References Cited

U.S. PATENT DOCUMENTS

| 10,467,622 | B1 * | 11/2019 | Rule ................... | G06Q 20/352 |
| 2013/0013499 | A1 * | 1/2013 | Kalgi .................. | G06Q 20/386 |
| | | | | 705/41 |
| 2020/0154256 | A1 | 5/2020 | Zhao | |

* cited by examiner

*Primary Examiner* — Nguyen T Vo
(74) *Attorney, Agent, or Firm* — Hammer & Associates, P.C.

(57) ABSTRACT

An automatic card connection method. The method comprises: when an Android device scans an NFC card to be tested, obtaining a carried tag; receiving an intent request sent by the tag; determining, on the basis of an Intent publishing system, an activity for processing the intent request of the tag; processing the intent request according to the determined activity to obtain an intent request result; searching for application programs installed in the device to obtain application programs matched with the intent request result; starting a target application program according to the selection of a user; calling a fourth preset method to obtain a tag value of said NFC card; and performing data communication connection with said NFC card on the basis of the tag value. According to the present invention, after the user selects the required target application program, data communication between the NFC card and the target application program is directly achieved, the communication fluency and the communication efficiency are improved, and the use experience of the user is improved.

17 Claims, 6 Drawing Sheets

AUTOMATIC CARD CONNECTION METHOD, ELECTRONIC DEVICE, AND COMPUTER READABLE STORAGE MEDIUM

FIELD OF THE INVENTION

The present invention relates to a method for auto-connecting a card, an electronic device and a computer-readable storage medium, which belongs to information security technology.

PRIOR ART

In the prior art, for an Android device with Near Field Communication, i.e. NFC, when an NFC card is moved to be closed to the Android device, the Android device can identify respective target applications corresponding to the NFC card and displays those applications; after a user selects a needed target application, the selected target application cannot perform communication with the NFC card; only when the user moves the NFC card away and then moves the NFC card to be closed to the Android device again, data communication between the target application and the NFC card can be realized, which makes the user have a bad experience.

Based on what is described above, after the user selects a needed target application, how to avoids moving the NFC card frequently in order to realize data communication between the target application and the NFC card becomes a technical problem which needs to be solved urgently.

SUMMARY OF THE INVENTION

The object of the present invention is to provide a method for auto-connecting a card, an electronic device and a computer-readable storage medium, which can realize data communication between an NFC card and a target application after a user selects the target application needed and avoids frequent moving of the NFC card for performing data communication, which can improve communication fluency and communication efficiency and using experience of the user.

According a first aspect of the present invention, there is provided a method for auto-connecting a card, is applied to an Android device with NFC function, the method includes steps of:

performing, by the Android device, process of scanning a card;

when the Android device gets a to-be-tested card by scanning, obtaining, by the Android device, a tag carried by the to-be-tested card;

receiving, by the Android device, an intent request sent by the tag;

confirming, by the Android device, an activity applied to process the intent request of the tag based on an Intent dispatch system;

processing, by the Android device, the intent request according to the confirmed an activity applied to process the intent request of the tag and obtaining an intent request result;

searching for, by the Android device, a self-installed application according to the intent request result and obtaining respective applications matched the intent request result;

displaying, by the Android device, the respective applications in such a way that a user can select a target application;

activating, by the Android device, the target application according to selection of the user;

invoking, by the target application, a fourth preset method to obtain a tag value of the to-be-tested NFC card;

performing, by the target application, data communication connecting to the to-be-tested NFC card based on the tag value.

Preferably, confirming, by the Android device, an activity applied to process the intent request of the tag based on Intent dispatch system includes:

inquiring, by the Android device, all intent filters based on the Intent dispatch system and obtaining an activity applied to process the intent request of the tag;

when at least two activities applied to process the intent request of the tag are obtained, using, by the Android device, an activity selector to select one activity applied to process the intent request of the tag from the at least two activities applied to process the intent request of the tag;

when one activity applied to process the intent request of the tag is obtained, selecting, by the Android device, the activity to be the activity applied to process the intent request of the tag.

Preferably, invoking, by the target application, a fourth preset method to obtain a tag value of the to-be-tested NFC card includes:

invoking, by the target application, a communicating device to use a fourth preset method to obtain a tag value of a to-be-tested NFC card.

Preferably, performing, by the target application, data communication connecting to the to-be-tested card based on the tag value includes:

invoking, by the target application, the communicating device to determine a tag value of the to-be-tested card and determining whether the tag value is null;

if the tag value is determined to be non-null, performing, by the target application, data communication connecting to the to-be-tested NFC card via an NFC function of the Android device;

if the tag value is determined to be null, returning, by the target application, an error notifying information.

Preferably, after performing, by the target application, data communication connecting to the to-be-tested NFC card based on the tag value, the method includes:

invoking, by the target application, the communicating device to perform communication failure monitoring on the data communication connecting to the to-be-tested NFC card;

when communication failure of data communication connecting is monitored, determining, by the target application, whether times of appearing communication failure reaches a preset threshold value, if the times of appearing communication failure does not reach the preset threshold value, keeping on performing, by the target application, communication failure monitoring on the data communication connecting via the communicating device; if the times of appearing communication failure reaches the preset threshold value, outputting, by the target application, a communicating failure notification;

when communication failure of data communication connecting is not monitored, keeping on, by the target application, data communication connecting to the to-be-tested NFC card.

Preferably, the communication failure includes any item of the following:

communication data is not sent to the to-be-tested NFC card by the target application in a first preset time period;

communication data sent to the to-be-tested NFC card by the target application in a first preset time period is not completed;

communication data sent from the to-be-tested NFC card is not received by the target application in a second preset time period;

communication data, which is sent from the to-be-tested NFC card, received by the target application in a second preset time period is not completed;

communication data, which is sent from the to-be-tested NFC card, received by the target application in a second preset time period is null;

a length of communication data, which is sent from the to-be-tested NFC card, received by the target application in a second preset time period is 0.

Preferably, after performing, by the target application, data communication connecting to the to-be-tested NFC card based on the tag value, the method further includes:

determining, by the target application, state of data communication connecting between the target application to the to-be-tested NFC card based on a preset linear;

if the state of data communication connecting between the target application to the to-be-tested card is unconnected, sending, by the target application, information instructing that data communication connecting is disconnected via the communicating device;

if the state of data communication connecting between the target application to the to-be-tested card is connected, keeping on, by the target application, determining state of the data communication connecting after a third preset time period via the communicating device.

According to second aspect of the present invention, there is provided a system for auto-connecting a card, applied to an Android device, the system includes:

a scanning unit configured to perform process of scanning for a card;

an obtaining unit configured to, when the Android device gets a to-be-tested card by scanning, obtain a tag carried in the to-be-tested card;

a receiving unit configured to receive an intent request sent by the tag;

a first processing unit configured to confirm an activity applied to process the intent request of the tag based on Intent dispatch system, process the intent request according to the confirmed an activity applied to process the intent request of the tag and obtain an intent request result, search for a self-installed application according to the intent request result and obtain respective applications matched the intent request result;

a displaying unit configured to display the respective applications in such a way that a user can select a target application;

an activating unit configured to activate the target application according selection of the user;

the obtaining unit configured to invoke a fourth preset method to obtain a tag value of the to-be-tested NFC card; and a communicating unit configured to perform data communication connecting to the to-be-tested NFC card based on the tag value.

Preferably, the first processing unit is configured to inquire all Intent filters based on the Intent dispatch system and obtain an activity applied to process the intent request of the tag; use an activity selector to select one activity applied to process the intent request of the tag from at least two activities applied to process the intent request of the tag when at least two activities applied to process the intent request of the tag are obtained; or, select an activity to be the activity applied to process the intent request of the tag when the activity applied to process the intent request of the tag is the only one obtained.

Preferably, the obtaining unit is configured to invoke a communicating device to use a fourth preset method to obtain a tag value of a to-be-tested NFC card.

Preferably, the communicating unit is configured to invoke the communicating device to determine a tag value of the to-be-tested NFC card and determine whether the tag value is null; perform data communication connecting to the to-be-tested NFC card via an NFC function of the Android device if the tag value is determined to be non-null; return an error notifying information if the tag value is determined to be null.

Preferably, the system further includes:

a monitoring unit configured to invoke the communicating device to perform communication failure monitoring on the data communication connecting to the to-be-tested card;

determine whether times of appearing communication failure reaches a preset threshold value when communication failure of data communication connecting is monitored, if the times of appearing communication failure does not reach the preset threshold value, keep on performing communication failure monitoring on the data communication connecting via the communicating device; if the times of appearing communication failure reaches the preset threshold value, output a communicating failure notification;

keep on performing data communication connecting to the to-be-tested NFC card when communication failure of data communication connecting is not monitored.

Preferably, the communication failure includes any item of the following:

communication data is not sent to the to-be-tested NFC card by the target application in a first preset time period;

communication data sent to the to-be-tested NFC card by the target application in a first preset time period is not completed;

communication data sent from the to-be-tested NFC card is not received by the target application in a second preset time period;

communication data, which is sent from the to-be-tested NFC card, received by the target application in a second preset time period is not completed;

communication data, which is sent from the to-be-tested NFC card, received by the target application in a second preset time period is null;

a length of communication data, which is sent from the to-be-tested NFC card, received by the target application in a second preset time period is 0.

Preferably, the system further includes:

a determining unit configured to determine state of data communication connecting between the target application to the to-be-tested NFC card based on a preset linear; send information instructing that data communication connecting is disconnected via the communicating device if the state of data communication connecting with the target application to the to-be-tested NFC card is unconnected; keep on determining state of the data communication connecting after a third preset time period via the communicating device if the state of data communication connecting between the target application to the to-be-tested NFC card is connected.

According to a third aspect of the present invention, there is provided an electronic device, which includes a processor and a storage;

the storage is configured to store operating instructions;

the processor is configured to execute the aforementioned method for auto-connecting a card by invoking those operating instructions.

According to a fourth aspect of the present invention, there is provided a computer-readable storage medium, which is configured to stores computer instructions; when the computer instructions run on a computer, the computer instructions cause a computer to execute the aforementioned method for auto-connecting a card.

According to the present invention, data communication can be directly realized between an NFC card and a target application after a user selects the target application needed; any frequent moving of the NFC card for performing data communication is avoided, which can improve communication fluency and communication efficiency and using experience of the user.

BRIEF DESCRIPTION OF THE DRAWINGS

The accompanying drawings are included to provide a further understanding of embodiments and constitute a part of this description. The drawings illustrate embodiments and, together with the description, serve to explain principles of embodiments. It should be expressly understood that the drawings are included for illustrative purposes and do not in any manner limit the scope of the present invention. Similar reference numerals designate corresponding similar parts. In the drawings.

DESCRIPTION OF EMBODIMENTS

The present invention provides a method for auto-connecting a card, an electronic device and a computer-readable storage medium, the specific implementation of the present application will be described in detail below with reference to the drawings.

The embodiments of the invention will be further described in details as below. Examples of the embodiments are shown in drawings, in which same or similar reference numbers always represent same or similar elements or elements with same or similar functions. The embodiments described with reference to the drawings are exemplary, just used for explaining the invention, not for limiting the invention.

Those skilled in the art may understand that "a", "an", "said" and "this" may also refer to plural nouns, unless otherwise specifically stated. It should be further understood that, phraseology "include" used in the specification of the invention refers to the presence of the characteristics, integers, steps, operations, elements and/or components, but not exclusive of the presence or addition of one or more other characters, integers, steps, operations, elements, components and/or groups thereof. It should be understood that when we mention that an element is "connected" or "coupled" to another element, it may be directly connected or coupled to the other elements, or intermediate elements may be available. In addition, "connection" or "coupling" used herein may include wireless connection or coupling. The phraseology "and/or" includes any one unit and all combinations of one or more associated listed items.

Unless otherwise defined, all terms (including technical and scientific terms) used herein have the same meaning as commonly understood by one of ordinary skill in the art to which the present invention belongs. It shall be further understood that terms, such as those defined in commonly used dictionaries, should be interpreted as having a meaning that is consistent with their meaning in the context of the relevant art and will not be interpreted in an idealized or overly formal sense unless expressly so defined herein.

In order to make the objectives, technical solutions, and advantages of the present application clearer, the implementation manners of the present application will be further described in detail below in conjunction with the accompanying drawings. The following specific embodiments may be combined, and same or similar concepts or processes may not be repeated in some embodiments.

The communicating device in the present embodiment may be included in an application or independent from the application.

Figure 1:
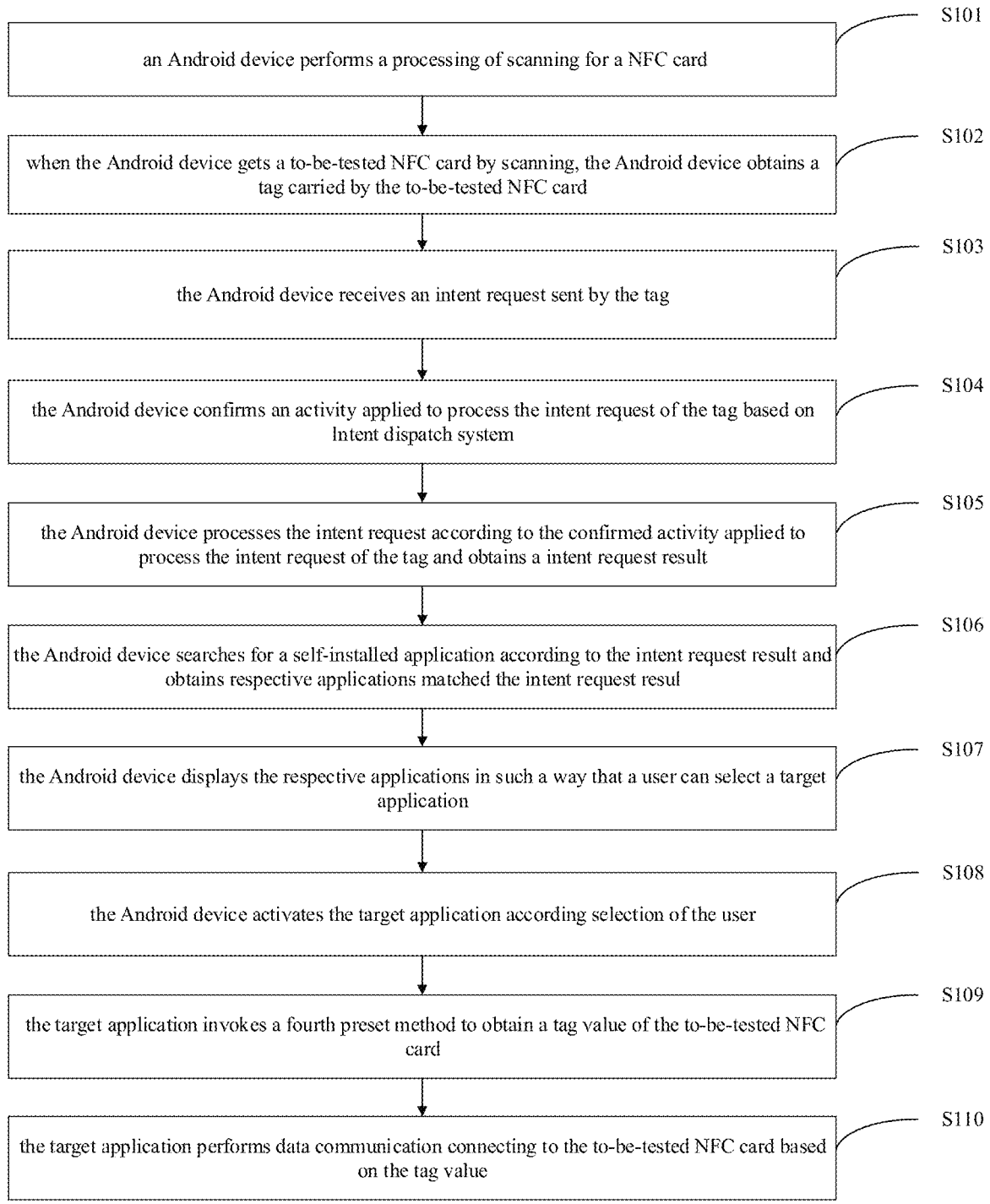
FIG. 1 is a flow chart for a method for auto-connecting a card provided by the present invention.

As shown in FIG. 1, a flow chart for a method for auto-connecting a card is provided by the present invention. The application is applied to an Android device with NFC function, which includes following steps:

Step S101, an Android device performs a processing of scanning for an NFC card;

Step S102, when the Android device gets a to-be-tested NFC card by scanning, the Android device obtains a tag carried by the to-be-tested NFC card;

Step S103, the Android device receives an intent request sent by the tag; Step S104, the Android device confirms an activity applied to process the intent request of the tag based on Intent dispatch system;

Step S105, the Android device processes the intent request according to the confirmed activity applied to process the intent request of the tag and obtains an intent request result;

Step S106, the Android device searches for a self-installed application according to the intent request result and obtains respective applications matched the intent request result;

Step S107, the Android device displays the respective applications in such a way that a user can select a target application;

Step S108, the Android device activates the target application according selection of the user;

Step S109, the target application invokes a fourth preset method to obtain a tag value of the to-be-tested NFC card;

Step S110, the target application performs data communication connecting to the to-be-tested NFC card based on the tag value.

In the present invention, data communication can be realized between an NFC card and a target application after a user selects the target application needed and any frequent moving of the NFC card for performing data communication can be avoided, which can improve communication fluency and communication efficiency and using experience of the user.

Based on the technical solution provided by the present invention, details will be given about the technical solution.

Figure 2A:
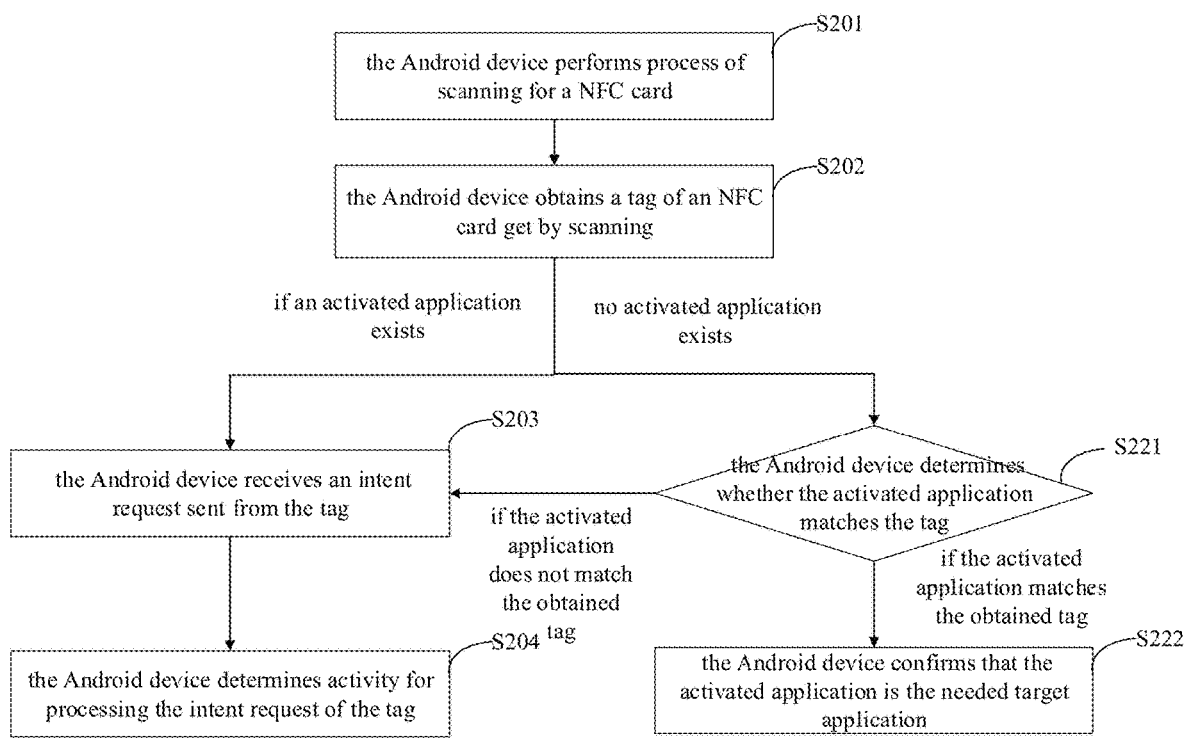
FIG. 2A is a flow chart for a process after an Android device obtains an NFC card provided by the present invention.
Figure 2B:
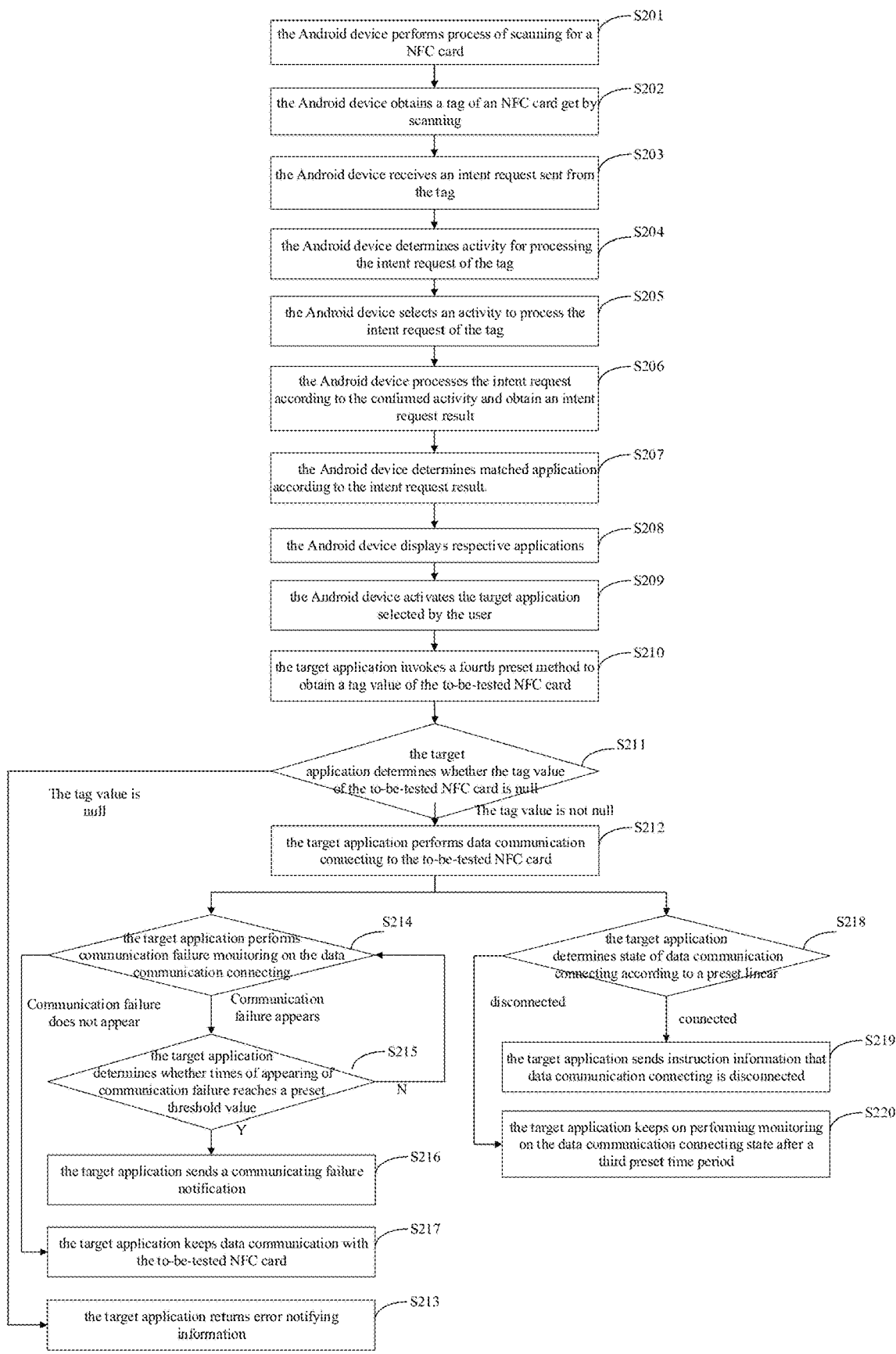
FIG. 2B is a flow chart for a process of executing auto-connecting the card by the Intent dispatch system provided by the present invention.
Figure 2C:
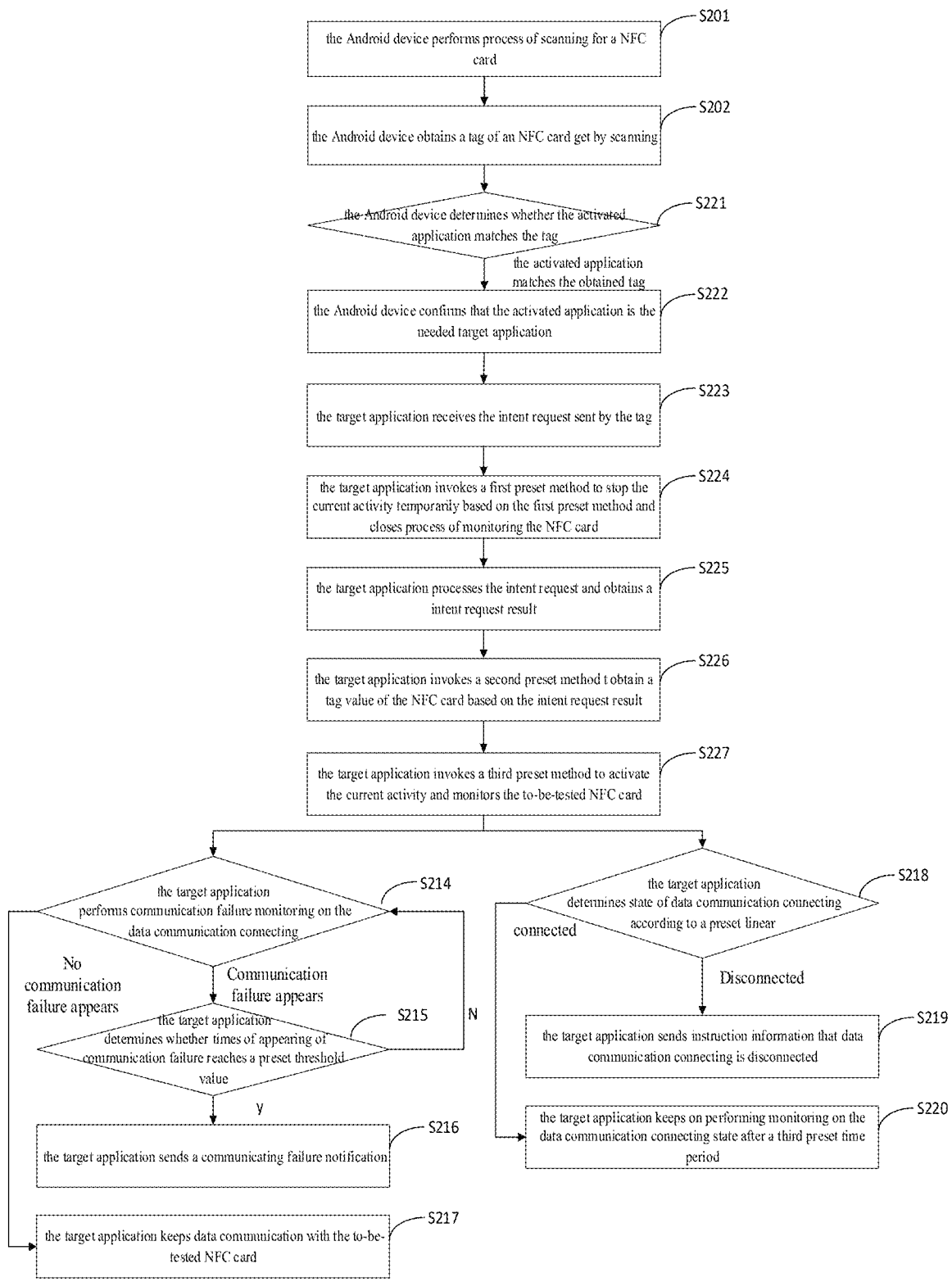
FIG. 2C is a flow chart for a process of executing auto-connecting the card by a foreground dispatch system provided by the present invention.

As shown in FIG. 2A to FIG. 2C, a flow chart of specific process of an embodiment of the method for auto-connecting a card is provided by the present invention. In this case, FIG. 2A is a flow chart for a process after an Android device obtains an NFC card; FIG. 2B is a flow chart for a process of executing auto-connecting the card by the Intent dispatch system; FIG. 2C is a flow chart for a process of executing auto-connecting the card by a foreground dispatch system. A first preset method, a second preset method, a third preset method and a fourth preset method in the embodiment of the present invention are methods which are preset in the application; therefore, application can directly invoke its own method if necessary.

For the present invention, preferably, process of the Step S101 specifically includes following process of Step S201.

Step S201, the Android device performs process of scanning for an NFC card.

Preferably, after the Android device activates its own NFC function, the Android device consecutively performs scanning for an NFC card in a preset category.

For the present invention, preferably, process of Step S102 specifically includes process of following Step S202.

Step S202, the Android device obtains a tag of an NFC card get by scanning.

Preferably, when the Android device performs consecutive scanning and gets a to-be-tested NFC card by scanning, the Android device directly obtains a tag carried by the to-be-tested NFC card.

For the present invention, preferably, after the Android device obtains the tag of the to-be-tested NFC card, the Android device can determine whether an activated application exists currently, if an activated application exists, go to Step S221 to determine whether the application matches the tag; if the activated application does not match the tag or no activated application exists, go to process of Step S203.

For the present invention, preferably, process of the Step S103 specifically includes process of following Step S203.

Step S203, the Android device receives an intent request sent from the tag.

Preferably, when the Android device obtains the tag of the NFC card, the Android device receives an intent request sent from the tag as well.

For the present invention, preferably, process of the Step S104 specifically includes process of Step S204 to Step S205.

Step S204, the Android device determines activity for processing the intent request of the tag.

Preferably, after the Android device receives the intent request of the tag, the Android device inquires all intent filters based on the Intent dispatch system and obtains an activity applied to process the intent request of the tag. In this case, the Intent dispatch system is a mechanism of binding when operating. By the Intent dispatch system, an application can express some request or intent to the Android device and the Android device will response the application by selecting a corresponding component.

Step S205, the Android device selects an activity to process the intent request of the tag.

Preferably, for the at least one activity, which is applied to process the intent request of the tag, obtained by filtering, the Android device selects a corresponding activity to process the intent request of the tag.

Preferably, when there are at least two activities applied to process the intent request of the tag, the Android device uses an activity selector to select one activity applied to process the intent request of the tag from the at least two activities applied to process the intent request of the tag.

When there is one activity applied to process the intent request of the tag, the Android device selects the activity to be the activity applied to process the intent request of the tag.

For the present invention, preferably, process of the Step S105 includes process of the following Step S206.

Step S206, the Android device processes the intent request according to the confirmed activity and obtain an intent request result.

Preferably, after confirming the corresponding activity applied to process the intent request of the tag, the Android device uses the activity to process corresponding intent request and obtains a corresponding intent request result.

For the present invention, preferably, the process of the Step S106 includes process of following Step S207.

Step S207, the Android device determines matched application according to the intent request result.

Preferably, the Android device searches for all self-stalled applications according to the obtained intent request result and selects respective applications matched the intent request result.

For the present invention, preferably, process of the Step S107 specifically includes process of following Step S208.

Step S208, the Android device displays respective applications.

Preferably, the Android device displays selected all respective application for a user to select and obtains a target application needed.

For the present invention, preferably, the process of Step S108 specifically includes process of following Step S209.

Step S209, the Android device activates the target application selected by the user.

Preferably, the Android device activates the target application selected by the user.

For the present invention, preferably, process of the Step S109 specifically includes process of following Step S210.

Step S210, the target application invokes a fourth preset method to obtain a tag value of the to-be-tested NFC card.

Preferably, after the target application is activated, the target application can invoke a communicating device and obtains a tag value of the to-be-tested NFC card by invoking onCreate method, i.e. the fourth preset method, via the communicating device.

In a specific embodiment, process of the Step S205 to Step S210 can include:

when a tag is got scanned by the Android device, the tag sends an intent request, i.e. Tag Intent, to the Android device; the Android device checks intent filters of all activities via the Intent dispatch system and finds activities which can process the intent request of the tag; if more than one activities are configured to be capable to process the tag intent, the Android device uses an activity selector for the user to select a wanted activity. After the user selects an activity, the Android device uses the activity selected by the user to process the Tag Intent and obtains a Tag Intent result; the Android device searches for its own application according to the Tag Intent and finds all matched application for the user to select; after the user selects a target application, the Android device activates the target application, which automatically invokes the communicating device, and obtains a tag value of the to-be-tested NFC card by that the communicating device invokes onCreate method, i.e. the fourth method, on the communicating device.

For the present invention, preferably, process of Step S110 specifically include process of Step S211 to Step S213.

Step S211, the target application determines whether the tag value of the to-be-tested NFC card is null.

Preferably, after obtaining the tag value, the target application determines whether the obtained tag value is null via the communicating device, if the tag value is null, go to process of Step S211, otherwise, go to process of Step S213.

Step S212, the target application performs data communication connecting to the to-be-tested NFC card.

Preferably, when the target application determines that the tag value is not null via the communicating device, the target application can perform data communication connecting to the to-be-tested NFC card via the NFC function of the Android device.

Step S213, the target application returns error notifying information.

For the present invention, preferably, after process of Step S212, the method further includes communication failure monitoring, i.e. process of Step S214 to Step S217, and determining process of data communication connecting state, i.e. process of Step S218 to Step S213.

In this case, the communication failure monitoring process specifically includes:

Step S214, the target application performs communication failure monitoring on the data communication connecting.

Preferably, after the target application performs data communication connecting to the to-be-tested NFC card, the target application performs communication failure monitoring on the data communication connecting in such a way that the target application can make a corresponding response when communication failure happens and it also avoids that data communication cannot be performed because of failure of data communication connecting. Therefore, the target application can invoke the communicating device to process the above communication failure and processes correspondingly based on the communication failure monitoring result. When communication failure is monitored on the data communication connecting, go to Step S215; otherwise, go to Step S217.

Preferably, the communication failure can include any item of the following:

communication data is not sent to the to-be-tested NFC card by the target application in a first preset time period;

communication data sent to the to-be-tested NFC card by the target application in a first preset time period is not completed;

communication data sent from the to-be-tested NFC card is not received by the target application in a second preset time period;

communication data, which is sent from the to-be-tested NFC card, received by the target application in a second preset time period is not completed;

communication data, which is sent from the to-be-tested NFC card, received by the target application in a second preset time period is null;

a length of communication data, which is sent from the to-be-tested NFC card, received by the target application in a second preset time period is 0.

The description of the communication failure is for exemplified the preferred implements listed by the present invention; any other same or similar state of the communication failure is fallen into the protective scope of the present invention.

Step S215, the target application determines whether times of appearing of communication failure reaches a preset threshold value.

Preferably, whenever the target application monitors that the communication failure of data communication connecting appears, the target application need determine whether times of appearing communication failure reaches a preset threshold value, if the times of appearing communication failure does not reach the preset threshold value, the target application keeps on performing communication failure monitoring by go to Step S214; otherwise, go to process of Step S216. In this case, the preset threshold value of times can be set up as needed and is not limited to a specific times value. Step S216, the target application sends a communicating failure notification.

Preferably, after the target application confirms that the times of the communication failure reaches the preset threshold value via the communicating device, the target application sends a communicating failure notification to tell the user to process correspondingly.

Step S217, the target application keeps data communication with the to-be-tested NFC card.

Preferably, because the target application monitors that communication failure does not appear on the data communication connecting via the communicating device, the target application can keep on performing data communication with the to-be-tested NFC card normally.

Preferably, after the target application is in status of data communication connecting to the NFC card, if there is no data communication between the target application and the NFC card for a long time, it is unknown that whether the data communication connecting between them is effective, therefore it is required to obtains state of data communication connecting in time so as to determine whether there is data communication between the target application and the NFC card; In this way, the connecting state of data communication can be determined via the communicating device, which specifically includes:

Step S218, the target application determines state of data communication connecting according to a preset linear.

Preferably, after the target application performs data communication connecting to the NFC card, the target application, the target application requires to determine state of data communication connecting between the target application to the NFC card via the communicating device; if the state of data communication connecting between the target application to the NFC card is disconnected, go to Step S219; otherwise, go to Step S220.

Step S219, the target application sends instruction information that data communication connecting is disconnected.

Preferably, after the target application confirms that the data communication connecting to the NFC card is disconnected, the target application sends corresponding instruction information to the user via the communicating device in such a way that the user can process correspondingly in time.

Step S220, the target application keeps on performing monitoring on the data communication connecting state after a third preset time period.

Preferably, after the target application confirms that data communication connecting to the NFC card is not disconnected via the communicating device, the target application keeps on perform monitoring on state of data communication connecting every preset period of time via the communicating device.

For the present invention, preferably, if the current activated application matches the obtained tag, go to process of Step S221.

Step S221, the Android device determines whether the activated application matches the tag.

Preferably, the Android device determines whether the current activated application matches the tag, if the activated application matches the obtained tag, go to process of Step S222; otherwise, go to process of Step S203.

Step S222, the Android device confirms that the activated application is the needed target application.

Step S223, the target application receives the intent request sent by the tag;

Step S224, the target application invokes a first preset method to stop the current activity temporarily based on the first preset method and closes process of monitoring the NFC card;

Step S225, the target application processes the intent request and obtains an intent request result;

Step S226, the target application invokes a second preset method to obtain a tag value of the NFC card based on the intent request result;

Step S227, the target application invokes a third preset method to activate the current activity and monitors the to-be-tested NFC card.

In this case, the process of Step S223 to Step S227 can be implemented by the target application via invoking the communicating device.

Preferably, after obtaining the tag value of the to-be-tested NFC card by executing Step S226, go to Step S214 of processing communication failure monitoring and go to process of Step S218 of determining communication connecting state.

In a specific embodiment, in process of Step S222 to Step S227, the foreground dispatch system permits an activity to intercept a tag intent, which has the highest priority and authority. The process above specifically includes:

The Android device has activated application, when a tag is get scanned by the Android device, the activated application is matched to the tag and the activated application is confirmed to be the target application, the tag will send the Tag Intent to the target application, the target application will invoke a first preset method, i.e. onPause method to stop the current activity temporarily and the process of monitoring the to-be-tested NFC card, which is implemented by customizing in the onPause method, will be stopped as well; then the target application processes the Tag Intent sent from the tag and obtains a Tag Intent result; at that time, the activity is not the foreground dispatch system anymore; then the target application will invoke a second method, i.e. onNewIntent method to obtain the tag value of the to-be-tested NFC card and afterwards invoke a third preset method, i.e. onResume method, to activate the activity; the activity will restore the foreground dispatch system, the process of monitoring the to-be-tested NFC card, which is implemented by customizing in the onResume method, will be reactivated as well.

In the present invention, data communication can be directly realized between an NFC card and a target application after a user selects the target application needed; frequent moving of the NFC card for performing data communication is avoided, which can improve communication fluency and communication efficiency and using experience of the user; monitoring the state of data communication state makes up of the shortage of monitoring the state of data communication state when there is no data communication between the NFC card and the target application for a long time.

Figure 3:
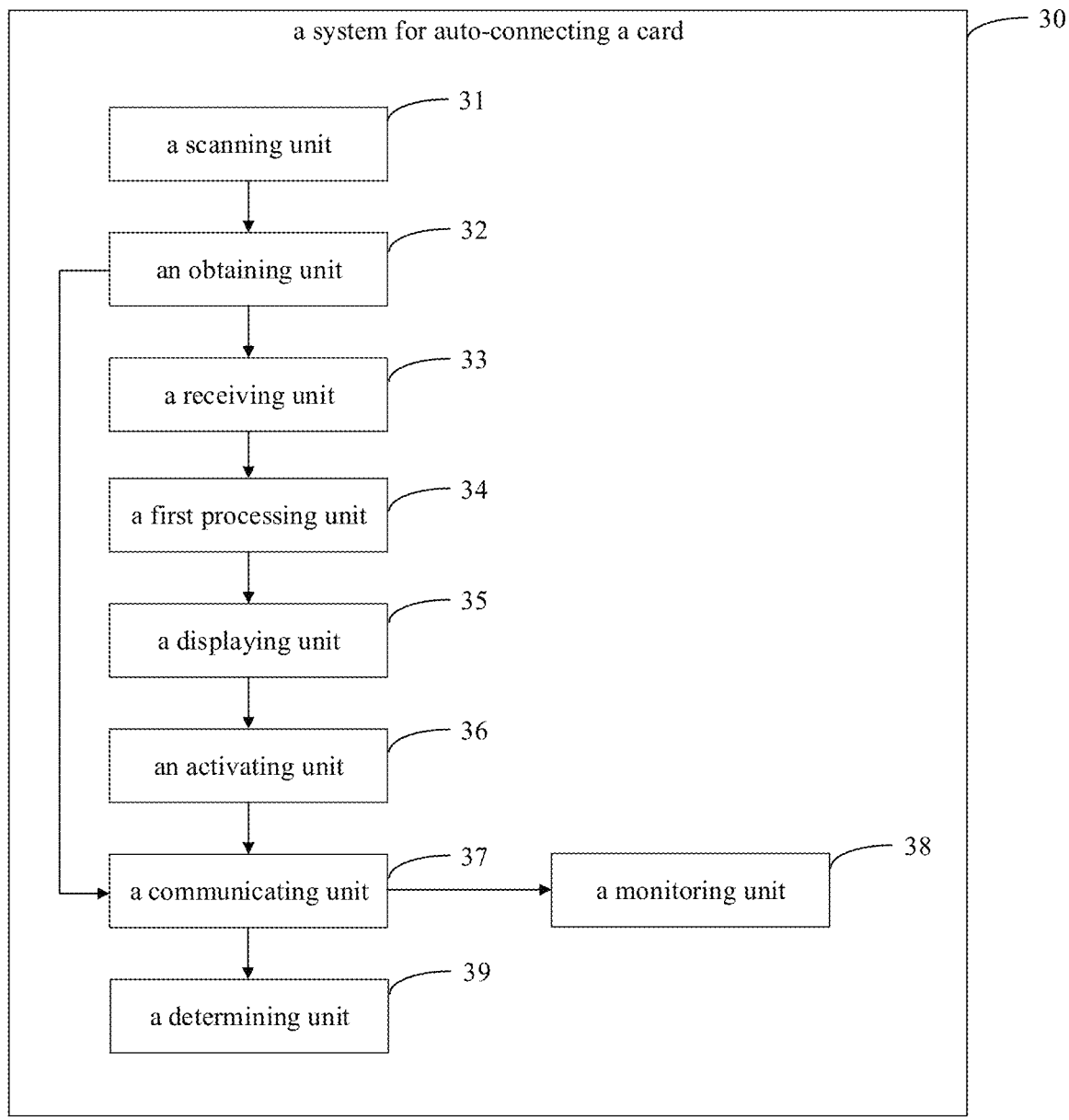
FIG. 3 is a schematic view of a system of auto-connecting a card provided by the present invention.

Based on the technical solution of the method for auto-connecting a card provided by the present invention, the present invention provides a system for auto-connecting a card, as shown in FIG. 3, the system for auto-connecting a card 30 is applied to an Android device with NFC function, which includes:

a scanning unit 31 configured to perform scanning a card;

an obtaining unit 32 configured to, when the Android device gets a to-be-tested card by scanning, obtain a tag carried in the to-be-tested card;

a receiving unit 33 configured to receive an intent request sent by the tag;

a first processing unit 34 configured to confirm an activity applied to process the intent request of the tag based on Intent dispatch system, process the intent request according to the confirmed an activity applied to process the intent request of the tag and obtain an intent request result, search for a self-installed application according to the intent request result and obtain respective applications matched the intent request result;

a displaying unit 35 configured to display the respective applications in such a way that a user can select a target application;

an activating unit 36 configured to activate the target application according selection of the user;

the obtaining unit 32 configured to invoke a fourth preset method to obtain a tag value of the to-be-tested card;

a communicating unit 37 configured to perform data communication connecting to the to-be-tested card based on the tag value.

Preferably, the first processing unit 34 is configured to inquire all intent filters based on the Intent dispatch system and obtain an activity applied to process the intent request of the tag; use an activity selector to select one activity applied to process the intent request of the tag from at least two activities applied to process the intent request of the tag when at least two activities applied to process the intent request of the tag are obtained; or, select an activity to be the activity applied to process the intent request of the tag when the activity applied to process the intent request of the tag is the only one obtained.

Preferably, the obtaining unit 32 is configured to invoke a communicating device to use a fourth preset method to obtain a tag value of a to-be-tested card.

Preferably, the communicating unit 37 is configured to invoke the communicating device to determine a tag value of the to-be-tested card and determine whether the tag value is null; perform data communication connecting to the to-be-tested card via NFC function of the Android device if the tag value is determined to be non-null; return an error notifying information if the tag value is determined to be null.

Preferably, the system further includes:

a monitoring unit 38 configured to invoke the communicating device to perform communication failure monitoring on the data communication connecting to the to-be-tested card; determine whether times of appearing communication failure reaches a preset threshold value when communication failure of data communication connecting is monitored, if the times of appearing communication failure does not reach the preset threshold value, keep on performing communication failure monitoring on the data communication connecting via the communicating device; if the times of appearing communication failure reaches the preset threshold value, output a communicating failure notification; keep on performing data communication connecting to the to-be-tested NFC card when communication failure of data communication connecting is not monitored.

Preferably, the communication failure includes any item of the following:

communication data is not sent to the to-be-tested NFC card by the target application in a first preset time period;

communication data sent to the to-be-tested NFC card by the target application in a first preset time period is not completed;

communication data sent from the to-be-tested NFC card is not received by the target application in a second preset time period;

communication data, which is sent from the to-be-tested NFC card, received by the target application in a second preset time period is not completed;

communication data, which is sent from the to-be-tested NFC card, received by the target application in a second preset time period is null;

length of communication data, which is sent from the to-be-tested NFC card, received by the target application in a second preset time period is 0.

Preferably, the system further includes:

a determining unit 39 configured to determine state of data communication connecting between the target application to the to-be-tested NFC card based on a preset linear; send information instructing that data communication connecting is disconnected via the communicating device if the state of data communication connecting between the target application to the to-be-tested NFC card is unconnected; keep on determining state of the data communication connecting after a third preset time period via the communicating device if the state of data communication connecting between the target application to the to-be-tested NFC card is connected.

In the present invention, data communication can be directly realized between an NFC card and a target application after a user selects the target application needed; frequent moving of the NFC card for performing data communication is avoided, which can improve communication fluency and communication efficiency and using experience of the user; monitoring the state of data communication state makes up of the shortage of monitoring the state of data communication state when there is no data communication between the NFC card and the target application for a long time.

Figure 4:
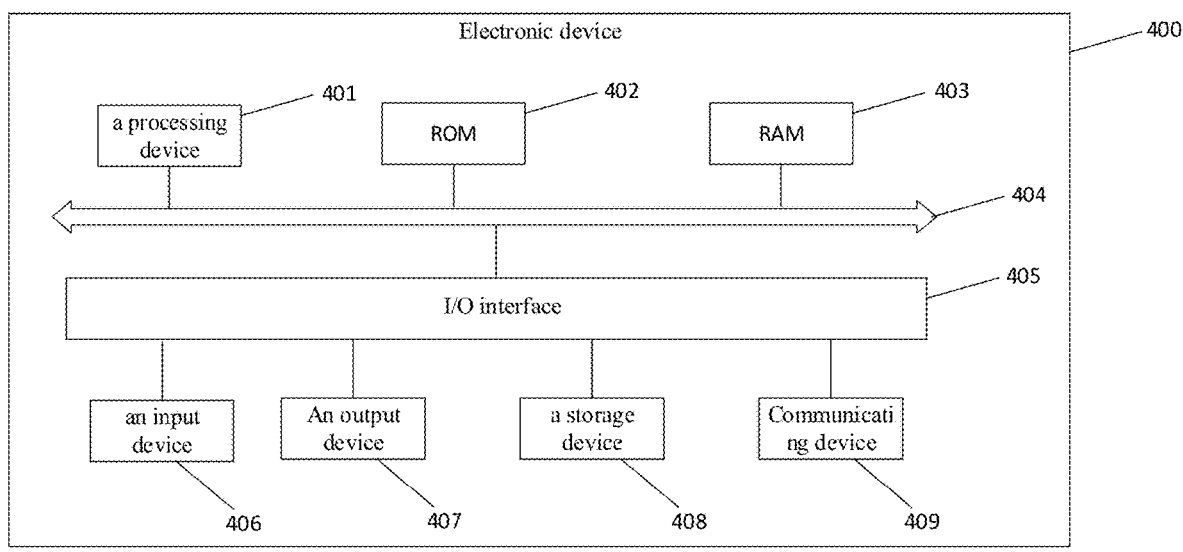
FIG. 4 is a schematic view of an electronic device of the method of auto-connecting a card provided by the present invention.

Referring to FIG. 4, it shows a structural diagram of an electronic device (for example, an Android device shown in FIG. 1) 400 adapted to implement the embodiments of the present application. The Android device in an embodiment of the present application may include but are not limited to a mobile terminal such as a mobile phone, a notebook computer, a digital broadcast receiver, a Personal Digital Assistant (PDA), a tablet computer (PAD), a Portable Multimedia Player (PMP), a vehicle mounted terminal (i.e. a vehicle mounted navigation terminal), etc., and a fixed terminal such as a digital TV, a desktop computer, or the like. The electronic device shown in FIG. 4 is only an example, and should not bring any limitation to the function and scope of use of the embodiments of the present application.

As shown in FIG. 4, the electronic device 400 can include a processing device 401 (for example, a central processing unit, a graphic processing unit, and the like) which can execute proper operation and process according to the program stored in read only memory (ROM) 402, or the program loaded to random access memory (RAM) 403 from a storage device 408. Various programs and data required for the operation of the electronic device 400 is also stored in RAM 403. The processing device 401, the ROM 402 and the RAM 403 are connected to each other via a bus 404. An input/output (I/O) interface 405 is also connected to the bus 404.

Generally, the following devices can be connected to the I/O interface 405, which include the input device 406 such as touching screen, touching panel, keyboard, camera, microphone, accelerometer, gyroscope, and the like, and the output device 407 such as liquid crystal display (LCD), speaker, oscillator, and the like, the storage device 408 such as tape, hardware, and the like, and a communicating device 409. The communicating device 409 can permit the electronic device 400 to perform wireless and wire communication with other devices to exchange data. Although FIG. 4 presents an electronic device 400 having various devices. It should be understood that not all of the devices are required or implemented. Alternatively, more or less devices can be required or implemented.

In particular, according to the embodiments of the present application, the process described above with reference to the flowchart can be implemented as a computer software program. For example, the embodiment of the present application can include a computer program product, which includes a computer program carried on a computer-readable medium, and the computer program includes program code for executing the method shown in the flowchart. In such an embodiment, the computer program may be downloaded and installed from the network through the communication device 409, or installed from the storage device 408, or installed from the ROM 402. When the computer program is executed by the processing device 401, it executes the above-mentioned functions defined in the method of the embodiment of the present application.

It should be noted that the above-mentioned computer-readable medium in this application may be a computer-readable signal medium or a computer-readable storage medium, or any combination of the two. The computer-readable storage medium may be, for example, but not limited to, an electrical, magnetic, optical, electromagnetic, infrared, or semiconductor system, device, or device, or a combination of any of the above. More specific examples of computer-readable storage media may include, but are not limited to: electrical connections with one or more wires, portable computer disks, hard disks, random access memory (RAM), read-only memory (ROM), erasable Programmable read-only memory (EPROM or flash memory), optical fiber, portable compact disk read-only memory (CD-ROM), optical storage device, magnetic storage device, or any suitable combination of the above. In this application, the computer-readable storage medium may be any tangible medium that contains or stores a program, and the program may be used by or in combination with an instruction execution system, apparatus, or device. In this application, the computer-readable signal medium may include a data signal propagated in baseband or as a part of a carrier wave, and computer-readable program code is carried therein. This propagated data signal can take many forms, including but not limited to electromagnetic signals, optical signals, or any suitable combination of the foregoing. The computer-readable signal medium may also be any computer-readable medium other than the computer-readable storage medium. The computer-readable signal medium may send, propagate, or transmit the program for use by or in combination with the instruction execution system, apparatus, or device. The program code contained on the computer-readable medium can be transmitted by any suitable medium, including but not limited to: wire, optical cable, RF (Radio Frequency), etc., or any suitable combination of the above.

The above-mentioned computer-readable medium may be included in the above-mentioned electronic device; or it may exist alone without being assembled into the electronic device.

The above-mentioned computer-readable medium carries one or more programs. When the above-mentioned one or more programs are executed by the electronic device, the electronic device: obtains at least two Internet protocol addresses; a node evaluation request for an Internet Protocol address, wherein the node evaluation device selects an Internet Protocol address from the at least two Internet Protocol addresses and returns it; receives the Internet Protocol address returned by the node evaluation device; wherein, the obtained the Internet Protocol address indicates the edge node in the content distribution network.

Alternatively, the aforementioned computer-readable medium carries one or more programs, and when the aforementioned one or more programs are executed by the electronic device, the electronic device: receives a node evaluation request including at least two Internet Protocol addresses; Among the at least two Internet Protocol addresses, one Internet Protocol address is selected; the selected Internet Protocol address is returned; wherein the received Internet Protocol address indicates an edge node in the content distribution network.

The computer program code used to perform the operations of this application can be written in one or more programming languages or a combination thereof. The above-mentioned programming languages include object-oriented programming languages, such as Java, Smalltalk, C++, and also conventional Procedural programming language-such as "C" language or similar programming language. The program code can be executed entirely on the user's computer, partly on the user's computer, executed as an independent software package, partly on the user's computer and partly executed on a remote computer, or entirely executed on the remote computer or server. In the case of a remote computer, the remote computer can be connected to the user's computer through any kind of network, including a local area network (LAN) or a wide area network (WAN), or it can be connected to an external computer (for example, using an Internet service provider to pass Internet connection).

The flowcharts and block diagrams in the accompanying drawings illustrate the possible implementation of the system architecture, functions, and operations of the system, method, and computer program product according to various embodiments of the present application. In this regard, each block in the flowchart or block diagram may represent a module, program segment, or part of code, and the module, program segment, or part of code contains one or more for realizing the specified logic function. Executable instructions. It should also be noted that, in some alternative implementations, the functions marked in the block may also occur in a different order from the order marked in the drawings. For example, two blocks shown in succession can actually be executed substantially in parallel, and they can sometimes be executed in the reverse order, depending on the functions involved. It should also be noted that each block in the block diagram and/or flowchart, and the combination of the blocks in the block diagram and/or flowchart, can be implemented by a dedicated hardware-based system that performs the specified functions or operations or it can be realized by a combination of dedicated hardware and computer instructions.

The units involved in the embodiments described in this application can be implemented in software or hardware. Wherein, the name of the unit does not constitute a limitation on the unit itself under certain circumstances. For example, the first obtaining unit can also be described as "a unit for obtaining at least two Internet Protocol addresses".

The above description is only a preferred embodiment of the present application and an explanation of the applied technical principles. Those skilled in the art should understand that the scope of disclosure involved in this application is not limited to the technical solutions formed by the specific combination of the above technical features, and should also cover the above technical features or technical solutions without departing from the above disclosed concept. Other technical solutions formed by arbitrarily combining the equivalent features. For example, the above-mentioned features and the technical features disclosed in this application (but not limited to) with similar functions are mutually replaced to form a technical solution.

The electronic device provided in this application is applicable to any embodiment of the aforementioned method for auto-connecting a card, and will not be repeated here.

In the present invention, data communication can be directly realized between an NFC card and a target application after a user selects the target application needed; frequent moving of the NFC card for performing data communication is avoided, which can improve communication fluency and communication efficiency and using experience of the user; monitoring the state of data communication state makes up of the shortage of monitoring the state of data communication state when there is no data communication between the NFC card and the target application for a long time.

The present application provides a computer-readable storage medium that stores computer instructions, and the computer instructions cause a computer to execute the method for auto-connecting a card shown in the above-mentioned embodiments.

The computer-readable storage medium provided in this application is applicable to any embodiment of the aforementioned method for auto-connecting a card, and will not be repeated here.

In the present invention, data communication can be directly realized between an NFC card and a target application after a user selects the target application needed; frequent moving of the NFC card for performing data communication is avoided, which can improve communication fluency and communication efficiency and using experience of the user; monitoring the state of data communication state makes up of the shortage of monitoring the state of data communication state when there is no data communication between the NFC card and the target application for a long time.

Those skilled in the art can understand that computer program instructions can be used to implement each block in these structural diagrams and/or block diagrams and/or flow diagrams and combinations of blocks in these structural diagrams and/or block diagrams and/or flow diagrams. Those skilled in the art can understand that these computer program instructions can be provided to processors of general-purpose computers, professional computers, or other programmable data processing methods for implementation, so that the computer or other programmable data processing method processors can execute this The structure diagram and/or block diagram and/or flow diagram disclosed in the application or the schemes specified in multiple boxes.

Among them, the various modules of the device of the present application can be integrated or deployed separately. The above-mentioned modules can be combined into one module or further divided into multiple sub-modules.

Those skilled in the art can understand that the accompanying drawings are only schematic diagrams of a preferred embodiment, and the modules or processes in the accompanying drawings are not necessarily necessary for implementing this application.

Those skilled in the art can understand that the modules in the device in the embodiment can be distributed in the device in the embodiment according to the description of the embodiment, or can be changed to be located in one or more devices different from this embodiment. The modules in the above-mentioned embodiments can be combined into one module or further divided into multiple sub-modules.

The above serial number of any embodiment of this application is for description only, and does not represent the advantages and disadvantages of the embodiments.

The above disclosures are only a few specific embodiments of the application, but the application is not limited to them, and any changes that can be thought of by those skilled in the art should fall into the protection scope of the application.

The invention claimed is:

1. A method for auto-connecting a card, applied to an Android device, wherein the method comprises the following steps:
    performing, by the Android device, a process of scanning the card;
    when the Android device gets a to-be-tested card by scanning, obtaining, by the Android device, a tag carried by the to-be-tested card;
    receiving, by the Android device, an intent request sent from the tag;
    confirming, by the Android device, an activity applied to process the intent request of the tag based on an Intent dispatch system;
    processing, by the Android device, the intent request according to the confirmed activity applied to process the intent request of the tag and obtaining an intent request result;
    searching for, by the Android device, an application installed in itself according to the intent request result and obtaining respective applications matched the intent request result;
    displaying, by the Android device, the respective applications in such a way that a user can select a target application;
    activating, by the Android device, the target application according to selection of the user;
    invoking, by the target application, an onCreate method to obtain a tag value of the to-be-tested card; and
    performing, by the target application, data communication connecting to the to-be-tested card based on the tag value.

2. The method of claim 1, wherein confirming, by the Android device, the activity applied to process the intent request of the tag based on the Intent dispatch system comprises:
    inquiring, by the Android device, all intent filters based on the Intent dispatch system and obtaining an activity applied to process the intent request of the tag;
    when at least two activities applied to process the intent request of the tag are obtained, using, by the Android device, an activity selector to select one activity applied to process the intent request of the tag from the at least two activities applied to process the intent request of the tag; and
    when only one activity applied to process the intent request of the tag is obtained, selecting, by the Android device, the activity to be the activity applied to process the intent request of the tag.

3. The method of claim 1, wherein invoking, by the target application, the onCreate method to obtain the tag value of the to-be-tested card comprises:
    invoking, by the target application, a communicating device to use the onCreate method to obtain the tag value of the to-be-tested card.

4. The method of claim 3, wherein performing, by the target application, data communication connecting to the to-be-tested card based on the tag value comprises:
    invoking, by the target application, the communicating device to determine the tag value of the to-be-tested card and determining whether the tag value is null;
    if the tag value is determined to be non-null, performing, by the target application, data communication connecting to the to-be-tested card via an NFC function of the Android device;
    if the tag value is determined to be null, returning, by the target application, error notifying information.

5. The method of claim 1, wherein after performing, by the target application, the data communication connecting to the to-be-tested card based on the tag value, the method comprises:
    invoking, by the target application, a communicating device to perform communication failure monitoring on the data communication connecting to a to-be-tested NFC card;
    when the communication failure of data communication connecting is monitored, determining, by the target application, whether times of appearing a communication failure reaches a preset threshold value via said communicating device, if the times of appearing communication failure does not reach the preset threshold value, keeping on performing, by the target application, communication failure monitoring on the data communication connecting via the communicating device; if the times of appearing communication failure reaches the preset threshold value, outputting, by the target application, a communicating failure notification;
    when the communication failure of data communication connecting is not monitored, keeping on, by the target application, data communication connecting to the to-be-tested card.

6. The method of claim 5, wherein the communication failure comprises any item of the following:
    communication data is not sent to the to-be-tested card by the target application in a first preset time period;
    communication data sent to the to-be-tested card by the target application in a first preset time period is not completed;
    communication data sent from the to-be-tested NFC card is not received by the target application in a second preset time period;
    communication data, which is sent from the to-be-tested NFC card, received by the target application in a second preset time period is not completed;
    communication data, which is sent from the to-be-tested NFC card, received by the target application in a second preset time period is null; or
    a length of communication data, which is sent from the to-be-tested NFC card, received by the target application in a second preset time period is 0.

7. The method of claim 1, wherein after performing, by the target application, the data communication connecting to the to-be-tested NFC card based on the tag value, the method further comprises:

determining, by the target application, state of data communication connecting with the target application to a to-be-tested NFC card based on a preset linear via a communicating device;

if the state of data communication connecting with the target application to the to-be-tested NFC card is unconnected, sending, by the target application, information instructing that data communication connecting is disconnected via the communicating device;

if the state of data communication connecting with the target application to the to-be-tested NFC card is connected, keeping on, by the target application, determining state of the data communication connecting after a third preset time period via the communicating device.

8. The method of claim 1, wherein the card is contact smart card or contactless smart card, which comprises, but not limited to, LF contactless card, HF contactless card, UHF contactless card, Gutta percha card, round coin card, dual-frequency card, dual-interface card, ID card, IC card, RFID card, NFC card, Mifare card.

9. A non-transitory computer-readable storage medium, wherein the computer-readable storage medium is configured to store computer instructions of claim 1, and the computer instructions are used to enable a computer to execute the method for auto-connecting the card of claim 1.

10. A system for auto-connecting a card, applied to an Android device, wherein the system comprises:
   a scanning unit configured to perform process of scanning the card;
   an obtaining unit configured to, when the Android device gets a to-be-tested card by scanning, obtain a tag carried in the to-be-tested card;
   a receiving unit configured to receive an intent request sent by the tag;
   a first processing unit configured to confirm an activity applied to process an intent request of the tag based on an Intent dispatch system, process the intent request according to the confirmed activity applied to process the intent request of the tag and obtain an intent request result, search for an application installed in itself according to the intent request result and obtain respective applications matched the intent request result;
   a displaying unit configured to display the respective applications in such a way that a user can select a target application;
   an activating unit configured to activate the target application according to selection of the user;
   the obtaining unit configured to invoke an onCreate method to obtain a tag value of the to-be-tested card;
   a communicating unit configured to perform data communication connecting to the to-be-tested card based on the tag value.

11. The system of claim 10, wherein the first processing unit is configured to inquire all intent filters based on the Intent dispatch system and obtain an activity applied to process the intent request of the tag; use an activity selector to select one activity applied to process the intent request of the tag from at least two activities applied to process the intent request of the tag when at least two activities applied to process the intent request of the tag are obtained; or, select an activity to be the activity applied to process the intent request of the tag when the activity applied to process the intent request of the tag is the only one obtained.

12. The system of claim 10, wherein the obtaining unit is configured to invoke a communicating device to use the onCreate method to obtain a tag value of a to-be-tested NFC card.

13. The system of claim 12, wherein the communicating unit is configured to invoke the communicating device to determine a tag value of the to-be-tested NFC card and determine whether the tag value is null; perform data communication connecting to the to-be-tested NFC card via an NFC function of the Android device if the tag value is determined to be non-null; while return error notifying information if the tag value is determined to be null.

14. The system of claim 10, wherein the system further comprises:
   a monitoring unit configured to invoke a communicating device to perform communication failure monitoring on the data communication connecting to a to-be-tested NFC card;
   determine whether times of appearing communication failure reaches a preset threshold value when communication failure of data communication connecting is monitored via the communicating device, if the times of appearing communication failure does not reach the preset threshold value, keep on performing communication failure monitoring on the data communication connecting via the communicating device;
   if the times of appearing communication failure reaches the preset threshold value, output a communicating failure notification;
   keep on performing data communication connecting to the to-be-tested NFC card when the communication failure of data communication connecting is not monitored.

15. The system of claim 14, wherein the communication failure comprises any item of the following:
   communication data is not sent to the to-be-tested NFC card by the target application in a first preset time period;
   communication data sent to the to-be-tested NFC card by the target application in a first preset time period is not completed;
   communication data sent from the to-be-tested NFC card is not received by the target application in a second preset time period;
   communication data, which is sent from the to-be-tested NFC card, received by the target application in a second preset time period is not completed; or
   communication data, which is sent from the to-be-tested NFC card, received by the target application in a second preset time period is null;
   a length of communication data, which is sent from the to-be-tested card, received by the target application in a second preset time period is 0.

16. The system of claim 10, wherein the system further comprises:
   a determining unit configured to determine state of data communication connecting with the target application to a to-be-tested NFC card based on a preset linear via a communicating device; send information instructing that the data communication connecting is disconnected via the communicating device if the state of data communication connecting with the target application to the to-be-tested NFC card is unconnected; while keep on determining state of the data communication connecting after a third preset time period via the communicating device if the state of data communication connecting with the target application to the to-be-tested NFC card is connected.

17. The system of claim 10, wherein the card is contact smart card or contactless smart card, which comprises, but not limited to, LF contactless card, HF contactless card, UHF contactless card, Gutta percha card, round coin card, dual-frequency card, dual-interface card, ID card, IC card, RFID card, NFC card, Mifare card.

\* \* \* \* \*